G. W. SEAMAN.
CONNECTING ROD.
APPLICATION FILED JUNE 4, 1914.
1,126,888.
Patented Feb. 2, 1915.
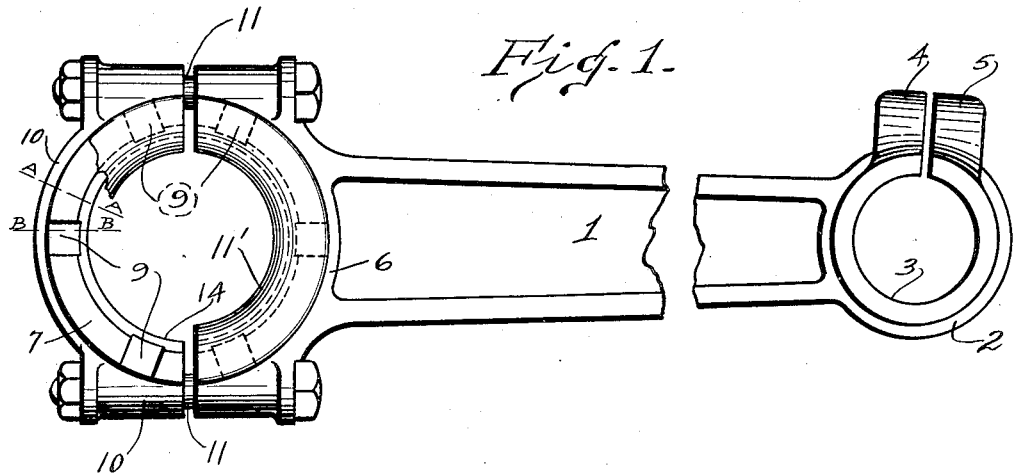
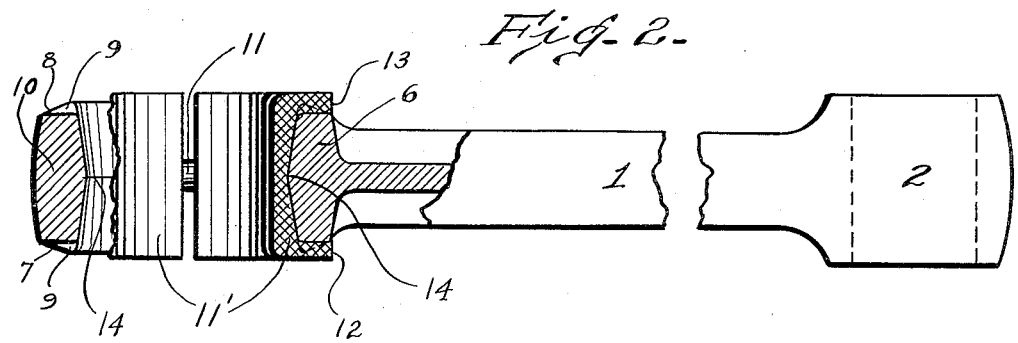
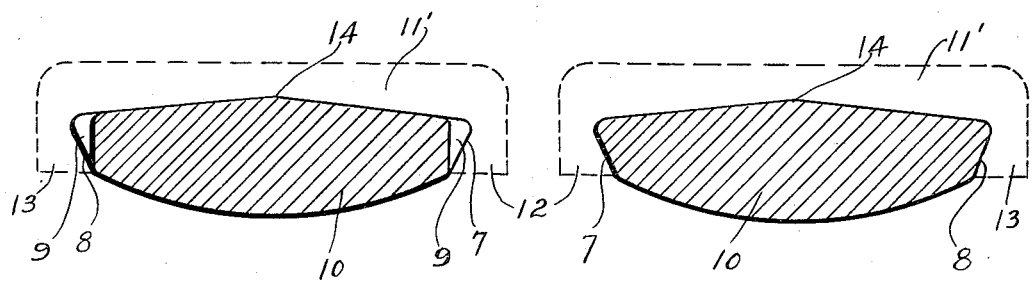
Witnesses
Samuel S. Matthes.
Lela Ritchie
Inventor
George W. Seaman
By John H. Boss
his Attorney

UNITED STATES PATENT OFFICE.

GEORGE W. SEAMAN, OF MANSFIELD, OHIO, ASSIGNOR TO THE AULTMAN & TAYLOR MACHINERY COMPANY, OF MANSFIELD, OHIO, A CORPORATION OF OHIO.

CONNECTING-ROD.

1,126,888.

Specification of Letters Patent.

Patented Feb. 2, 1915.

Application filed June 4, 1914. Serial No. 842,834.

*To all whom it may concern:*

Be it known that I, GEORGE W. SEAMAN, a citizen of the United States of America, residing at Mansfield, in the county of Richland and State of Ohio, have invented certain new and useful Improvements in Connecting-Rods, of which the following is a specification.

My invention relates to connecting rods which are designed to be equipped with Babbitt bearings.

The objects of my invention are to provide a means of making and securely fastening or locking a Babbitt journal bearing to one end of a connecting rod and to a cap provided therefor in such a manner as to prevent the rotation of or separation of the bearings from the connecting rod or cap thereof.

I attain these and other objects by the mechanism illustrated in the accompanying drawings, in which:—

Figure 1 is a plan view of the connecting rod showing a cap secured thereto. Fig. 2 is a side elevation of Fig. 1 partly in longitudinal section. Fig. 3 is a sectional view of the cap on the line A—A of Fig. 1. Fig. 4 is a sectional view of the cap on the line B—B of Fig. 1.

In the drawings reference numeral 1 represents a connecting rod preferably made I shape in cross section. An eye 2 is formed on one end to provide a journal bearing 3 or to receive a sleeve (not shown) which is held in place by compressing the lugs 4 and 5.

My invention primarily consists in forming an enlarged ring or eye on one end of the connecting rod and beveling or inclining both sides 7 and 8 toward the plane of the rod and forming a series of notches 9 at predetermined points in the beveled surfaces 7 and 8. The ring is cut in two parts providing an adjustable cap 10 and a semicircular part 6. The parts are fastened together by bolts 11 which pass through suitable lugs formed on the cap 10 and the part 6.

To construct the Babbitt bearings and secure them to the connecting rod and cap a shaft is inserted in the center of the part 6 and the cap 10 and metal (preferably babbitt) in a liquid state is poured or forced around the shaft forming the bearings 11' and the projecting parts 12 and 13 which close upon and interlock with the beveled portions 7 and 8 thereby preventing the Babbitt bearings from separating from the part 6 or cap 10. The liquid metal also flows into the notches 9 forming lugs on the bearings which fit said notches, thereby preventing the bearings from any tendency to rotate upon the part 6 or cap 10.

What I claim is:—

1. A connecting rod provided with a semicircular part on one end, a complementary cap part adjustably secured thereto, both of said parts being provided with bevel sides with notches formed therein, bearings to engage said bevel sides and notches, as and for the purpose described.

2. A connecting rod provided with a semicircular part on one end, a complementary cap part adjustably secured thereto, both of said parts being provided with bevel sides with notches formed therein, bearings to engage said bevel sides and notches, said parts also being provided with inclined inner surfaces.

3. A connecting rod having one end formed with bevel sides and notches to engage and receive a bearing, a bearing constructed to fit said bevel sides and notches, a complementary cap adjustably secured to the end of said connecting rod, said cap being provided with bevel sides and notches to receive a bearing, a bearing adapted to engage the bevel sides and notches of said cap, as and for the purpose described.

4. A connecting rod having one end formed with bevel sides and notches to engage and receive a bearing, a bearing constructed to fit said bevel sides and notches, a complementary cap adjustably secured to the end of said connecting rod, said cap being provided with bevel sides and notches to receive a bearing, a bearing adapted to engage the bevel sides and notches of said cap, said cap and end of the rod being provided with inclined inner surfaces.

In testimony whereof I affix my signature in presence of two witnesses.

GEORGE W. SEAMAN.

Witnesses:
 JOHN H. BOSS,
 LELA RITCHIE.